United States Patent [19]

Birkelbach et al.

[11] 4,243,785

[45] Jan. 6, 1981

[54] HIGH EFFICIENCY CATALYST FOR POLYMERIZING OLEFINS

[75] Inventors: Donald F. Birkelbach, Angleton; George W. Knight, Lake Jackson, both of Tex.

[73] Assignee: The Dow Chemical Company, Midland, Mich.

[21] Appl. No.: 939,638

[22] Filed: Sep. 5, 1978

[51] Int. Cl.³ .......................... C08F 4/02; C08F 10/02
[52] U.S. Cl. ............................... 526/115; 252/429 C; 526/122; 526/125; 526/348.5; 526/352
[58] Field of Search ........................................ 526/115

[56] References Cited

U.S. PATENT DOCUMENTS

| | | | |
|---|---|---|---|
| 3,737,393 | 6/1973 | de Vries | 526/151 |
| 4,120,820 | 10/1978 | Birkelbach | 526/151 |

FOREIGN PATENT DOCUMENTS

| | | | |
|---|---|---|---|
| 837251 | 6/1960 | United Kingdom | 526/115 |
| 1235062 | 6/1971 | United Kingdom | 526/151 |
| 1492379 | 11/1977 | United Kingdom. | |
| 1500873 | 2/1978 | United Kingdom. | |

*Primary Examiner*—Edward J. Smith
*Attorney, Agent, or Firm*—J. G. Carter

[57] ABSTRACT

α-Olefins are polymerized by conducting the polymerization in the presence of a catalyst prepared by reacting tetravalent or trivalent titanium compounds such as a titanium tetralkoxide, an anhydrous nickel compound such as nickel chloride, an organomagnesium component such as a hydrocarbon soluble complex of dialkyl magnesium and an alkyl aluminum and a halide source such as a hydrogen halide or an alkyl aluminum halide. Polymerization processes employing this catalyst composition do not require conventional catalyst removal steps in order to provide polymers having suitable color and other physical characteristics and these catalysts produce polymers having broader molecular weight distributions than do corresponding catalysts without the anhydrous nickel compound.

19 Claims, No Drawings

HIGH EFFICIENCY CATALYST FOR POLYMERIZING OLEFINS

BACKGROUND OF THE INVENTION

This invention relates to a new catalyst composition useful for initiating and promoting polymerization of α-olefins and to a polymerization process employing such a catalyst composition.

It is well known that olefins such as ethylene, propylene and 1-butene in the presence of metallic catalysts, particularly the reaction products of organometallic compounds and transition metal compounds can be polymerized to form substantially unbranched polymers of relatively high molecular weight. Typically such polymerizations are carried out at relatively low temperatures and pressures.

Among the methods for producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups 4B, 5B, 6B and 8 of Mendeleev's Periodic Table of Elements with an organometallic compound. Generally, the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, polymerization is carried out in a reaction medium comprising an inert organic liquid, e.g., an aliphatic hydrocarbon and the aforementioned catalyst. One or more olefins may be brought into contact with the reaction medium in any suitable manner. A molecular weight regulator, which is normally hydrogen, is usually present in the reaction vessel in order to suppress the formation of undesirably high molecular weight polymers.

Following polymerization, it is common to remove catalyst residues from the polymer by repeatedly treating the polymer with alcohol or other deactivating agent such as aqueous base. Such catalyst deactivation and/or removal procedures are expensive both in time and material consumed as well as the equipment required to carry out such treatment.

Furthermore, most of the aforementioned known catalyst systems are more efficient in preparing polyolefins in slurry (i.e., wherein the polymer is not dissolved in the carrier) than in solution (i.e., wherein the temperature is high enough to solubilize the polymer in the carrier). The lower efficiencies of such catalysts in solution polymerization is generally believed to be caused by the general tendency of such catalysts to become rapidly depleted or deactivated by significantly higher temperatures that are normally employed in solution processes. In addition, processes involving the copolymerization of ethylene with higher α- olefins exhibit catalyst efficiencies significantly lower than ethylene homopolymerization processes.

Recently, catalysts having higher efficiencies have been disclosed, e.g., U.S. Pat. No. 3,392,159, U.S. Pat. No. 3,737,393, West German Patent Application No. 2,231,982 and British Pat. Nos. 1,305,610 and 1,358,437. While the increased efficiencies achieved by using these recent catalysts are significant, even higher efficiencies are desirable particularly in copolymerization processes. These high efficiency catalysts generally produce polymers of relatively narrow molecular weight distribution. It is therefore desirable to have, for some applications such as for use in injection molding, high efficiency catalysts which produce polymers and copolymers having a broader molecular weight distribution.

In view of the foregoing problems encountered in the use of conventional Ziegler catalysts, it would be highly desirable to provide a polymerization catalyst that is sufficiently active, even at solution polymerization temperature above 140° C., to produce such high quantities of olefin homopolymers or copolymers per unit of catalyst that it is no longer necessary to remove catalyst residue in order to obtain a polymer of the desired purity.

Also it is highly desirable to have catalysts which produce copolymers such as ethylene/hexene-1 or ethylene/octene-1 having a low melt index at densities below about 0.920 g/cc.

SUMMARY OF THE INVENTION

The present invention, in one aspect, is the catalytic reaction product of (A) a tetravalent titanium compound or a complex of a trivalent titanium compound with an electron donor, (B) an anhydrous divalent nickel compound, (C) an organomagnesium component and (D) a halide source. The magnesium component is (1) a complex of an organomagnesium compound and an organometallic compound which solubilizes the organomagnesium compound in a hydrocarbon solvent or (2) an organomagnesium compound. The halide source is a non-metallic halide corresponding to the formula R'X wherein R' is hydrogen or an active monovalent organic radical and X is halogen. Alternatively, the halide source is a metallic halide corresponding to the formula $MR_{y-a}X_a$ wherein Group 2B, 3A or 4A of Mendeleev's Periodic Table of the Elements, R is a monovalent organic radical usually hydrocarbyl or hydrocarbyloxy, X is halogen, y is a number corresponding to valence of M and a is a number from 1 to y. The proportions of the foregoing components of said catalytic reaction products are such that the atomic ratios of the elements are:

Mg:Ti is from about 1:1 to about 2000:1, preferably from about 5:1 to about 200:1; most preferably from about 5:1 to about 75:1;

Al:Ti is from about 0.1:1 to about 2000:1, preferably from about 0.5:1 to about 200:1; most preferably from about 1:1 to about 75:1;

Ni:Ti is from about 0.01:1 to about 500:1 preferably from about 0.1:1 to about 100:1; most preferably from about 1:1 to about 40:1;

excess X:Al is from about 0.0005:1 to about 10:1 preferably from about 0.002:1 to about 2:1 most preferably from about 0.01:1 to about 1.4:1.

The excess X is excess halide above that which would be theoretically required to convert the magnesium compound and nickel compound (when the nickel compound is a carboxylate) to the dihalide if they were not added in the dihalide form in the preparation of the catalyst.

In a second aspect, the invention is a process for polymerizing at least one α-olefin under conditions characteristic of Ziegler polymerization wherein the aforementioned reaction product is employed as the sole catalyst when such contains aluminum or when there is additionally employed an organometallic compound containing aluminum if the catalyst does not contain aluminum.

In view of the reduced activity of conventional Ziegler catalysts in the copolymerization of α-olefins, particularly at solution polymerization temperatures, it is indeed surprising that the aforementioned catalytic reaction product is a high efficiency catalyst capable of producing more than a million pounds of olefin polymer or copolymer per pound of transition metal under such polymerization conditions. Accordingly, olefin polymers produced in accordance with the foregoing process generally contain lower amounts of catalyst residues than polymers produced in the presence of conventional catalyst even after subjecting such conventionally produced polymers to catalyst removal treatments. Further, these catalytic reaction products provide a relatively broad molecular weight distribution.

DETAILED DESCRIPTION OF THE PREFERRED EMBODIMENTS

The present invention is most advantageously practiced in a polymerization process wherein an α-olefin is polymerized, generally in the presence of hydrogen as a molecular weight control agent, in a polymerization zone containing an inert diluent and the catalytic reaction product as hereinbefore described. Especially advantageous is the copolymerization of ethylene with higher α-olefins using the catalytic reaction product of this invention. The foregoing polymerization process is most beneficially carried out under inert atmosphere and relatively low temperature and pressure, although very high pressures are optionally employed.

Olefins which are suitably homopolymerized or copolymerized in the practice of this invention are generally the aliphatic α-monoolefins or α-diolefins having from 2 to 18 carbon atoms. Illustratively, such α-olefins can include ethylene, propylene, butene-1, pentene-1, 3-methylbutene-1, 4-methylpentene-1, hexene-1, octene-1, dodecene-1, octadecene-1, 1,7-octadiene and the like. It is understood that α-olefins may be copolymerized with other α-olefins and/or with small amounts i.e., up to about 25 weight percent based on the polymer of other ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50, especially from about 0.1 to about 40 weight percent of propylene, butene-1, hexene-1, octene-1, 4-methylpentene-1, 1,7-octadiene or similar α-olefin or diolefin based on total monomer.

Suitable nickel compounds which can be advantageously employed include those nickel compounds represented by the formula Ni(Q)$_n$ wherein Q is an anion such as, for example a halide such as chlorine, or bromine, hydroxide, carboxylate, carbonate, nitrate, sulfate, mixtures thereof and the like and n is two (2) divided by the valence of Q.

Particularly suitable nickel compounds are the carboxylates having from 1 to about 12 carbon atoms, preferably from about 6 to about 10 carbon atoms. The hydrocarbon soluble carboxylates such as, for example, 2-ethylhexanoate, naphthenate and the like are particularly preferred since they form smaller particle size nickel chloride when prereacted with a suitable halogen source. However, it is not necessary to prereact the nickel carboxylate with a halide source.

Advantageously, the tetravalent titanium compound is represented by the empirical formula: TiXn(OR)$_{4-n}$ wherein X is a halogen, particularly chlorine or bromine, R is an alkyl or an aryl group having from 1 to 12 carbon atoms and n has a value of 0 to 4. Such titanium compounds are preferably derived from the titanium halides wherein one or more of the halogen atoms are replaced by an alkoxy or aryloxy group. Exemplary of such compounds include tetrabutoxy titanium, tetra(isopropoxy)titanium, dibutoxy titanium dichloride, monoethoxy titanium trichloride, tetraphenoxytitanium and the like.

Advantageously, the trivalent titanium complex is represented by the empirical formula: TiZ$_3$(L)$_x$ wherein Z is halide, and L is an electron donating compound such as water or an organic electron donor, e.g., alcohol, ether, ketone, amine or olefin, and x is a number from 1 to 6. Usually, the organic electron donor has from 1 to 12 carbon atoms and donates an unshared pair of electrons to the complex. In preferred complexes, Z is chloride or bromide, most preferably chloride and L is alcohol, especially an aliphatic alcohol having 2 to 8 carbon atoms and most preferably 3 to 6 carbon atoms such as isopropyl alcohol, n-propyl alcohol, n-butyl alcohol and isobutyl alcohol. While the exact structure of the complex is not known, it is believed to contain 3 valence bonds to the halide ions and 1 to 6, preferably 2 to 4 coordination bonds to the electron donating compound. The titanium halide complex is most advantageously prepared by heating the trivalent titanium halide dispersed in the electron donating compound under nitrogen or similar inert atmosphere. Usually the formation of the complex is visually indicated by a definite change in color. For example, when the dark purple α-TiCl$_3$ is heated in anhydrous isopropyl alcohol under nitrogen, complex formation is indicated by the formation of a brilliant blue solution. The complex is normally solid; however, liquid complexes would be suitable.

In addition to a α-TiCl$_3$, the Δ, γ and β crystalline forms of titanium trichloride are advantageously employed in the preparation of the complex. Also suitable are titanium tribromide, titanium trifluoride and the like. Of the foregoing, the Δ- and α- forms of titanium trichloride are preferred. Exemplary electron donating compounds suitably employed include aliphatic alcohols, e.g., isopropyl alcohol, ethanol, n-propyl alcohol, butanol and others having from 1 to 10 carbon atoms; ethers; ketones; aldehydes; amines; olefins, and the like having from 1 to 12 carbon atoms and water.

The preferred organomagnesium component is a hydrocarbon soluble complex illustrated by the formula MgR″$_2$·xMR″$_y$ wherein R″ is hydrocarbyl or hydrocarbyloxy, M is aluminum, zinc or mixtures thereof and x is about 0.001 to 10, especially from about 0.15 to about 2.5 and y denotes the number of hydrocarbyl groups which corresponds to the valence of M. As used herein, hydrocarbyl and hydrocarbyloxy are monovalent hydrocarbon radicals. Preferably, hydrocarbyl is alkyl, cycloalkyl, aryl, aralkyl, alkenyl and similar hydrocarbon radicals having 1 to 20 carbon atoms, with alkyl having 1 to 10 carbon atoms being especially preferred. Likewise, preferably, hydrocarbyloxy is alkoxy, cycloalkyloxy, aryloxy, aralkyloxy, alkenyloxy and similar oxyhydrocarbon radicals having 1 to 20 carbon atoms, with alkyloxy having 1 to 10 carbon atoms is preferred. Hydrocarbyl is preferred over hydrocarbyloxy. This complex is prepared by reacting particulate magnesium such as magnesium turnings, or magnesium particles with about a stoichiometric amount of hydrocarbyl or hydrocarbyloxy halide, illustrated as R'X. The resulting hydrocarbon insoluble $MgR''_2$ is solubilized by adding the organometallic compound such as $AlR''_3$ or mixtures thereof with $ZnR''_2$. The amount of organometallic compounds which is added to the $MgR''_2$ to form the organomagnesium complex should be enough to solubilize a significant amount of $MgR''_2$, e.g., at least 5 weight percent of $MgR''_2$ is solubilized. It is preferred to solubilize at least 50 weight percent of the $MgR''_2$ and especially preferred to solubilize all the $MgR''_2$. When employing a mixture of $AlR''_3$ and $ZnR''_2$ to solubilize $MgR''_2$, the atomic ratio of Zn to Al is from about 3000:1 to about 0.1:1, preferably from about 350:1 to about 1:1. In order to obtain maximum catalyst efficiency at polymerization temperatures above 180° F., it is desirable to minimize the amount of aluminum in the complex as well as in the total catalyst. Accordingly, for catalysts having Al:Ti atomic ratios less than 120:1, it is desirable to have a Mg:Al atomic ratio more than 0.3:1, preferably from about 0.5:1 to 10:1. In suitable complexes, organometallic compounds (other than $AlR''_3$, $ZnR''_2$ or mixtures thereof) which also solubilize the organomagnesium compound in hydrocarbon are employed in beneficial amounts, usually an amount sufficient to produce an atomic ratio of 0.01:1 to 10:1 of metal of the organometallic compounds to magnesium. Examples of such other organometallic compounds include boron trialkyls such as boron triethyl, alkyl silanes such as dimethyl silane and tetraethyl silane, alkyl tin and alkyl phosphorous compounds.

Alternative to the aforementioned solubilized magnesium complexes, it is also advantageous to employ organomagnesium compounds as the organomagnesium component. Such compounds, although often insoluble in hydrocarbons, are suitably employed. These compounds can be rendered soluble in hydrocarbon by addition of ether, amine, etc., although such solubilizing agents often reduce the activity of the catalyst. Recently, such compounds have been made hydrocarbon soluble without using such catalyst poisons, e.g., as taught in U.S. Pat. No. 3,646,231. The more recent hydrocarbon soluble organomagnesium compounds are the most desirable if an organomagnesium compound is to be used as the organomagnesium component.

Preferably the organomagnesium compound is a hydrocarbon soluble dihydrocarbylmagnesium such as the magnesium dialkyls and the magnesium diaryls. Exemplary suitable magnesium dialkyls include particularly n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium and others wherein alkyl has from 1 to 20 carbon atoms. Exemplary suitable magnesium diaryls include diphenylmagnesium, dibenzylmagnesium, and ditolylmagnesium, being especially preferred. Suitable organomagnesium compounds include alkyl and aryl magnesium alkoxides and aryloxides and aryl and alkyl magnesium halides with the halogen-free organomagnesium compounds being more desirable.

The preferred halide sources are the active non-metallic halides of the formula set forth hereinbefore including hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride preferably as active as t-butyl chloride. In addition to the organic monohalides, it is understood that organic dihalides, trihalides and other polyhalides that are active as defined hereinbefore as also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, α-phenylethyl bromide, diphenyl methyl chloride and the like. Most preferred are hydrogen chloride, t-butyl chloride, allyl chloride and benzyl chloride.

Suitable metallic halides as set forth by formula hereinbefore are organometallic halides and metal halides wherein the metal is in Group 2B, 3A or 4A, of Mendeleev's Periodic Table of Elements. Preferred metallic halides are aluminum halides of the formula $AlR_{3-a}X_a$ wherein each R is independently hydrocarbyl or hereinbefore defined such as alkyl, X is a halogen and a is a number from 1 to 3. Most preferred are alkylaluminum halides such as ethylaluminum sesquichloride, diethylaluminum chloride, ethylaluminum dichloride, and diethyl-aluminum bromide, with ethylaluminum dichloride being especially preferred. Alternatively, a metal halide such as aluminum trichloride or a combination of aluminum trichloride with an alkyl aluminum halide or a trialkyl aluminum compound may be suitably employed.

It is understood that the organic moieties of the aforementioned organomagnesium, e.g., R'', and the organic moieties of the halide source, e.g., R and R', are suitably any other organic radical provided that they do not contain functional groups that poison conventional Ziegler catalysts. Preferably such organic moieties do not contain active hydrogen, i.e., those sufficiently active to react with the Zerewitinoff reagent.

In order to maximize catalyst efficiency, the catalyst is prepared by mixing the components of the catalyst in an inert liquid diluent in the following especially preferred order: nickel compound, organomagnesium compound, halide source and titanium compound or complex. Somewhat less preferred is the order of addition wherein the organomagnesium component is first added to an inert liquid diluent followed by the addition of the halide source, the nickel compound and then the titanium compound or complex. The foregoing catalyst components are combined in proportions sufficient to provide atomic ratios as previously mentioned.

In the most preferred manner, the nickel halide is preformed from the reaction of a hydrocarbon soluble nickel carboxylate such as nickel di-2-ethylhexanoate or nickel dinaphthenate with a halogen source such as those suitable for use as component (D) in a hydrocarbon diluent which precipitates anhydrous nickel halide in a very fine particulate form.

In cases wherein neither the organomagnesium component nor the halide source contains aluminum, it is desirable to include in the total catalyst an aluminum compound such as an alkyl aluminum compound, e.g., a trialkyl aluminum, an alkyl aluminum halide or an aluminum halide. If polymerization temperatures below 180° C. are employed, the atomic ratios of Al:Ti may be from about 0.1:1 to about 2000:1, preferably from 1:1 to 200:1. However, when polymerization temperatures above 180° C. are employed, the aluminum compound is used in proportions such that the Mg:Al ratio is more than 0.3:1, preferably from 0.5:1 to 10:1, and Al:Ti ratio is less than 120:1, preferably less than 75:1. It is understood, however, that the use of very low amounts of aluminum necessitates the use of high purity solvents or diluents in the polymerization zone. Further, other components present in the zone should be essentially free of impurities which react with aluminum alkyls. Otherwise additional quantities of an organometallic compound as previously described, preferably an organo aluminum or an organozinc compound must be used to react with such impurities. Moreover, it is understood that in the catalyst the aluminum compound should be in the form of trialkyl aluminum or alkyl aluminum halide provided that the alkyl aluminum halide be substantially free of alkyl aluminum dihalide.

The foregoing catalytic reaction preferably carried out in the presence of an inert diluent. The concentrations of catalyst components are preferably such that when the essential components of the catalytic reaction product are combined, the resultant slurry is from about 0.005 to about 1.0 molar (moles/liter) with respect to magnesium. By way of an example of suitable inert organic diluents can be mentioned liquefied ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about $-50°$ to about $200°$ C. Also included as suitable inert diluents are benzene, toluene, ethylbenzene, cumene, decalin and the like.

Mixing of the catalyst components to provide the desired catalytic reaction product is advantageously carried out under an inert atmosphere such as nitrogen, argon or other inert gas at temperatures in the range from about $-100°$ to about $200°$ C., preferably from about $0°$ to about $100°$ C. The period of mixing is not considered to be critical as it is found that a sufficient catalyst composition most often occurs within about 1 minute or less. In the preparation of the catalytic reaction product, it is not necessary to separate hydrocarbon soluble components from hydrocarbon insoluble components of the reaction product.

In the polymerization process employing the aforementioned catalytic reaction product, polymerization is effected by adding a catalytic amount of the above catalyst composition to a polymerization zone containing α-olefin monomer, or vice versa. The polymerization zone is maintained at temperatures in the range from about $0°$ to about $300°$ C., preferably at solution polymerization temperatures, e.g., from about $130°$ to about $250°$ C. for a residence time of about a few seconds to several days, preferably 15 seconds to 2 hours. It is generally desirable to carry out the polymerization in the absence of moisture and oxygen and a catalytic amount of the catalytic reaction product is generally within the range from about 0.0001 to about 0.1 millimoles titanium per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of titanium. Generally in the polymerization process, a carrier which may be an inert organic diluent or solvent or excess monomer, is generally employed. In order to realize the full benefit of the high efficiency catalyst of the present invention, care must be taken to avoid oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitably as defined hereinbefore.

The polymerization pressures preferably employed are relatively low, e.g., from about 50 to about 1000 psig, especially from about 100 to about 600 psig. However, polymerization within the scope of the present invention can occur at pressures from atmospheric up to pressures determined by the capabilities of the polymerization equipment. During polymerization it is desirable to stir the polymerization recipe to obtain better temperature control and to maintain uniform polymerization mixtures throughout the polymerization zone.

In order to optimize catalyst yields in the polymerization of ethylene, it is preferable to maintain an ethylene concentration in the solvent in the range from about 1 to about 10 weight percent, most advantageously about 1.2 to about 2 weight percent. To achieve this, when an excess of ethylene is fed into the system, a portion of the ethylene can be vented.

Hydrogen can be employed in the practice of this invention to lower the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalytic reaction product and monomer together with intimate agitation provided by suitable stirring or other means. Agitation can be continued during polymerization, or in some instances, the polymerization can be allowed to remain unstirred while the polymerization takes place. In the case of more rapid reactions with more active catalysts, means can be provided for refluxing monomer and solvent, if any of the latter is present and thus removing the heat of reaction. In any event adequate means should be provided for dissipating the exothermic heat of polymerization. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventionally employed for deactivating Ziegler catalysts. The resultant polymer is found to contain insignificant amounts of catalyst residue and to possess a relatively broad molecular weight distribution.

The following examples are given to illustrate the invention, and should not be construed as limiting its scope. All parts and percentages are by weight unless otherwise indicated.

The following atomic weight values were employed in the examples to calculate the ratios of the components.

| Al = 26.98 | Ni = 58.71 |
|---|---|
| C = 12.01 | O = 16.00 |
| Cl = 35.45 | Sn = 118.69 |
| H = 1.01 | Ti = 47.90 |
| Mg = 24.31 | Zn = 65.37 |

In the following examples, the melt index values $I_2$ and $I_{10}$ were determined by ASTM D 1238-70 and the density values were determined by ASTM D 1248.

General Operating Procedure for Working Examples

In the following examples, the catalyst preparations were carried out in the absence of oxygen (<5 ppm) or water (<5 ppm) in a nitrogen filled 120 ml serum bottle. The catalyst components were used as diluted solutions in either n-heptane, 2,2,4-trimethylpentane or Isopar ® E (a mixture of saturated isoparaffins having 8 to 9 carbon atoms). The polymerization reactions were carried out in a five liter stainless steel stirred batch reactor at 150° C. unless otherwise stated. In such polymerization reactions two liters of dry oxygen-free Isopar ® E were added to the reactor and heated to 150° C. The reactor was vented to about 20-25 psig and 15 to 20 psi of hydrogen was added for polymer molecular weight control. Then 120 psi of ethylene was added to the reactor and the ethylene pressure was set to maintain the reactor pressure at 160 psig. The catalyst was then pressured into the reactor using nitrogen and the reactor temperature was maintained for the desired polymerization time. The polymerization reactor contents were dumped into a beaker and allowed to cool. The resulting polymer slurry was dried in a vacuum oven and weighed. The ethylene consumption during polymerization was recorded with a DP cell which indicates the approximate rate of polymerization and the amount of polymer produced. Catalyst efficiencies are reported as grams of polyethylene per gram of titanium, gPE/gTi.

EXAMPLE 1

A. Preparation of Anhydrous $NiCl_2$

An anhydrous nickel chloride ($NiCl_2$) slurry in Isopar ® E (a mixture of isoparaffins having 8 or 9 carbon atoms) was prepared as follows $NiCl_2$ $6H_2O$ was heated in a vacuum oven at about 100° C. for 8-10 hours. The resultant partially dried product was then subjected to an n-propyl alcohol soxhlet type extraction into Isopar ® E to produce a fine slurry of anhydrous $NiCl_2$ in Isopar ® E. The n-propyl alcohol was then removed by distillation.

b. Preparation of the Catalyst Composition

The catalyst composition was prepared by adding with stirring under a nitrogen atmosphere to a 4-ounce (118.28 cc) serum bottle the following components in the indicated order:
48.45 ml of Isopar ® E
0.18 ml of 0.084 M anhydrous $NiCl_2$ in Isopar ® E
0.74 ml of 0.385 M Mg(n-Bu, sec-Bu) in Isopar ® E
0.44 ml of 0.85 M $EtAlCl_2$ in Isopar ® E
0.19 ml of 0.04 M $Ti(OiPr)_4$ in Isopar ® E The temperature of the serum bottle was maintained at ambient temperature and reaction was observed to be complete within 5 minutes.

The atomic ratios of the catalyst components were as follows:
Mg/Ti=38:1
Al/Ti=50:1
Ni/Ti=2:1
excess Cl/Al=24:50=0.48:1

C. Polymerization

Into a stirred 5-liter stainless steel batch reactor was added two liters of Isopar ® E, 19 psig of hydrogen, 120 psig of ethylene. Then 10 ml (0.0015 millimoles Ti) of the above catalyst composition was added when the reactor temperature had reached 150° C. The temperature was controlled at 150° C. and the total pressure was maintained constant at 160 psig. Total reaction time was 20 minutes yielding 100 grams of polyethylene indicating a catalyst efficiency of $1.14 \times 10^6$ grams of polymer per gram of Ti. The resultant polymer had a melt index ($I_2$) of 4.35, a melt index ($I_{10}$) of 38.72, an $I_{10}/I_2$ of 8.9 and a density of 0.9647 g/cc.

EXAMPLE 2

Employing the procedures of Example 1 a catalyst was prepared employing the following components in their listed order of addition:
42.12 ml of Isopar ® E
0.45 ml of 0.084 M anhydrous $NiCl_2$
5.8 ml of 0.045 M $MgCl_2$ (prepared from HCl and n-Bu-s-Bu Mg)
0.09 ml of 0.85 M ethylaluminum dichloride
0.33 ml of 0.9 M aluminumtriethyl
1.21 ml of 0.0062 M $TiCl_3(iPrOH)_x$ The atomic ratios of this catalyst were as follows:
Al/Ti=50:1
Ni/Ti=5:1
excess Cl/Al=20:50=0.4:1
Mg/Ti=35:1

Polymerization was conducted according to the standard operating procedures at 150° C. in a 5 liter batch lab reactor. Twenty (20) milliliters of hexene-1 was added to the reactor along with 20 psi $H_2$ and 120 psig ethylene. The final reactor pressure was 165 psig. Twenty milliliters (0.003 millimoles of Ti) of the above catalyst yielded 156 grams of polymer for an efficiency of $1.1 \times 10^6$ g polymer/g Ti. The polymer had a broad molecular weight distribution with a high molecular weight tail as indicated by gel permeation chromatography. The polymer had the following properties:
0.69 melt index ($I_2$)
8.14 ($I_{10}$)
11.8 $I_{10}/I_2$ 0.9427 g/cc density

EXAMPLE 3

Following the general operating procedure described hereinbefore, several catalysts were prepared and polymerization runs were made. Unless otherwise indicated, the total catalyst concentration in the reactor was 0.001 millimolar based on Ti and the polymerization temperature was 150° C. The catalysts are given in Table I and the polymerization results are given in Table II. Unless otherwise indicated, the temperature was 150° C., and the ethylene pressure was 120 psig.

TABLE I

| Run No. | Order of Addition (1) | Atomic Ratios Mg/Ni/Al/XsCl/Ti |
|---|---|---|
| 1 | NiCl$_2$/DnBMg . 1/6ATE/EADC/ATE/Ti(OiPr)$_4$ | 20/20/50/20/1 |
| 2 | same | same |
| 3 | same | same |
| 4 | same | same |
| 5 | same | 10/30/50/20/1 |
| 6 | same | 30/10/50/20/1 |
| 7 | same | 20/20/50/20/1 |
| 8 | same | same |
| 9 | same | same |
| 10 | NiCl$_2$/DnBMg . 1/3ATE/EADC/ATE/Ti(OiPr)$_4$ | 30/10/38/36/1 |
| 11 | same | same |
| 12 | MgCl$_2$/NiCl$_2$/EADC/ATE/Ti(OiPr)$_4$ | 30/10/38/36/1 |
| 13 | same | 30/10/30/10/1 |
| 14 | NiCl$_2$/nBsBMg/EADC/Ti(OiPr)$_4$ | 38/2/50/24/1 |
| 15 | same | 36/4/50/28/1 |
| 16 | NiCl$_2$/nBsBMg/ATE/EADC/Ti(OiPr)$_4$ | 40/1/80/10/1 |
| 17* | NiCl$_2$/nBsBMg/EADC/Ti(OiPr)$_4$ | 40/2/50/20/1 |
| 18* | same | 40/5/50/20/1 |
| 19 | NiCl$_2$/MgCl$_2$/EADC/ATE/TiCl$_3$ . (iPrOH)$_x$ | 35/5/50/20/1 |

(1) NiCl$_2$ = anhydrous nickel chloride prepared as example 1-A
DnBMg . 1/6ATE = di(n-butyl)magnesium . 1/6 aluminum triethyl
EADC = ethyl aluminum dichloride
ATE = aluminum triethyl
Ti(OiPr)$_4$ = tetra(isopropoxy)titanium
DnBMg . 1/3ATE = di(n-butyl)magnesium . ⅓ aluminum triethyl
nBsBMg = n-butyl s-butyl magnesium
TiCl$_3$ . (iPrOH)$_x$ = complex of titanium trichloride and isopropyl alcohol, x = ~3–4
*The nickel chloride was prepared by drying at 350° C. and ball milling for 24 hours.

TABLE II

| Run No. | Catalyst Efficiency g polymer/ g Titanium × 10$^{-6}$ | Hydrogen Pressure psig | Melt Index I$_2$ | Melt Index I$_{10}$ | I$_{10}$/I$_2$ | Density g/cc |
|---|---|---|---|---|---|---|
| 1 | 0.84 | 0 | 0.02 | 0.35 | 17.5 | 0.9546 |
| 2 | 1.2 | 19 | 0.28 | 3.22 | 11.5 | 0.9601 |
| 3 | 1.3 | 38 | 0.21 | 2.47 | 11.8 | 0.9599 |
| 4 | 1.4 | 57 | 0.14 | 1.75 | 12.5 | 0.9587 |
| 5 | 0.47 | 19 | 0.02 | 0.49 | 24.5 | 0.9555 |
| 6 | 1.7 | 19 | 0.17 | 3.24 | 19.1 | 0.9603 |
| 7 | 1.3 | 19 | 0.15 | 2.63 | 17.5 | 0.9588 |
| 8 | 1.2 | 38 | 0.72 | 1.61 | 22.4 | 0.9580 |
| 9* | 0.8 | 38 | 0.10 | 1.57 | 15.7 | 0.9588 |
| 10 | 1.5 | 19 | 0.77 | 8.35 | 10.8 | 0.9625 |
| 11 | 1.6 | 19 | 0.34 | 5.97 | 17.6 | 0.9616 |
| 12 | 0.6 | 19 | 0.06 | 0.94 | 15.7 | 0.9548 |
| 13 | 0.71 | 19 | 0.05 | 0.70 | 14.0 | 0.9573 |
| 14 | 1.4 | 19 | 4.35 | 38.68 | 8.9 | 0.9647 |
| 15 | 1.1 | 19 | 1.29 | 13.33 | 10.3 | 0.9636 |
| 16 | 1.5 | 19 | 6.45 | 52.19 | 8.1 | 0.9657 |
| 17 | 1.4 | 19 | 20.92 | 142.91 | 6.8 | 0.9687 |
| 18 | 2.0 | 19 | 11.25 | 90.86 | 8.1 | 0.9679 |
| 19** | 1.1 | 19 | 0.69 | 8.14 | 11.8 | 0.9427 |

Footnotes:
*Polymerization temperature was 180° C. instead of 150° C.
**20 ml of hexene-1 was added so as to prepare a copolymer of ethylene/hexene-1.

EXAMPLE 4

A. Preparation of Anhydrous NiCl$_2$

To a mixture of 0.60 gram (0.5 millimoles) of a nickel di-2-ethylhexanoate solution in mineral spirits containing 6% Ni by weight (commercially available from Alfa Division of the Ventron Corp., Danvers, Mass.) and 97.8 ml of 2,2,4-trimethyl pentane (TMP) was added 1.65 ml of 0.94 M (1.5 moles) ethyl aluminum dichloride (EADC). Immediately upon addition of the EADC, a fine particle size gold colored slurry was formed.

B. Preparation of the Catalyst compositions

The catalyst composition was prepared by adding with stirring under a nitrogen atmosphere to a 4-ounce (118.28 cc) serum bottle the following components in the indicated order:

94.47 ml TMP
3.0 ml of 0.005 M of the above prepared NiCl$_2$ in TMP
0.97 ml of 0.62 M butyl ethyl magnesium (BEM)
0.64 ml of 0.94 M EADC
0.32 ml of 0.91 M triethylaluminum (ATB) in TMP
0.60 ml of 0.025 M tetra-isopropyl titanate (Ti(OiPr)$_4$) in TMP.

The temperature of the serum bottle was maintained at ambient temperature (~22° C.) and the reaction was observed to be complete within 5 minutes or less.

The atomic ratios of the catalyst components were as follows:
Mg/Ti=40/1
Al/Ti=60/1
Ni/Ti=1/1
excess Cl:Al=0.1/1

C. Polymerization

The aforementioned stirred 5-liter batch reactor containing 2 liters of Isopar ® E was heated to 150° C. The solvent vapor pressure was about 21 psig. Then was added 19 psig of hydrogen and 160 psig of ethylene for a total reactor pressure of 200 psig. Twenty ml. (0.003 moles Ti) of the above catalyst was injected into the reactor, and the reactor pressure was maintained constant at 200 psig with ethylene. The total reaction time was 30 minutes, 177 gm of polyethylene was obtained for a yield of 1.23×10$^6$ gm PE/gm Ti. The product had a melt index of 0.78, an I$_{10}$ of 8.70, I$_{10}$/I$_2$ of 11.15, and a density of 0.9610.

EXAMPLE 5

Following the general operating procedure described hereinbefore, several catalysts were prepared and polymerization runs were made. Unless otherwise indicated, the total catalyst concentration in the reactor was 0.001 millimolar based on Ti and the polymerization temperature was 150° C. The catalysts are given in Table III and the polymerization results are given in Table IV. Unless otherwise indicated the ethylene pressure was 120 psig and the total pressure was 160 psig.

TABLE III

| Run No. | Order of Addition (1) | Atomic Ratios Mg/Ni/Al/XsCl/Ti |
|---|---|---|
| 1 | Ni(OH)$_2$/BEM/EADC/Ti(OiPr)$_4$ | 40/2/50/20/1 |
| 2 | Same | 40/4/50/20/1 |
| 3 | Same | 40/8/50/20/1 |
| 4 | Ni(OH)$_2$/BEM/EADC/Ti(OiPr)$_4$/ATE | 40/2/70/20/1 |
| | The atomic ratio of 70 Al was 50 from EADC + 20 from ATE | |
| 5 | NiCO$_3$/BEM/EADC/Ti(OiPr)$_4$ | 40/2/50/20/1 |
| 6 | Same | 40/4/50/20/1 |
| 7 | Ni(Oct)$_2$/BEM/EADC/Ti(OiPr)$_4$ | 40/2/50/16/1 |
| 8 | Same | 40/4/50/12/1 |
| 9 | Ni(Oct)$_2$/BEM/EADC/Ti(OiPr)$_4$/ATE | 40/8/70/4/1 |
| | The atomic ratio of 70 for Al was 50 from EADC + 20 from ATE | |
| 10 | Ni(Ac-Ac)$_2$/BEM/EADC/Ti(OiPr)$_4$ | 40/2/50/20/1 |
| 11 | Same | 40/4/50/20/1 |

(1) Ni(OH)$_2$ - anhydrous nickel hydroxide
BEM = butyl, ethyl magnesium
EADC = ethyl aluminum dichloride
Ti(OiPr)$_4$ = tetra (isopropoxy) titanium
ATE = aluminum triethyl
NiCO$_3$ = anhydrous nickel carbonate
Ni(Oct)$_2$ = anhydrous nickel octoate
Ni(Ac-Ac)$_2$ = anhydrous nickel acetylacetonate

TABLE IV

| Run No. | Catalyst Efficiency g polymer/ g Titanium × 10$^{-6}$ | Hydrogen Pressure psig | Melt Index I$_2$ | Melt Index I$_{10}$ | I$_{10}$/I$_2$ | Density g/cc |
|---|---|---|---|---|---|---|
| 1 | 1.13 | 19 | 12.42 | 94.44 | 7.60 | .9654 |
| 2 | 1.53 | 19 | 17.63 | 124.88 | 7.08 | .9681 |
| 3 | 0.90 | 19 | 9.42 | 70.40 | 7.39 | .9644 |
| 4 | 1.29 | 19 | 11.47 | 85.65 | 7.47 | .9668 |
| 5 | 1.78 | 19 | 15.63 | 120.44 | 7.84 | .9670 |
| 6 | 1.71 | 19 | 16.14 | 106.74 | 6.61 | .9666 |
| 7 | 0.72 | 19 | 21.05 | 145.38 | 6.91 | .9662 |
| 8 | 0.82 | 19 | 10.44 | 75.96 | 7.28 | .9657 |
| 9 | 0.68 | 19 | 3.44 | 26.82 | 7.80 | .9623 |
| 10* | 0.71 | 19 | 2.71 | 23.72 | 8.75 | .9626 |
| 11* | 0.55 | 19 | 0.31 | 4.51 | 14.55 | .9691 |

*The ethylene pressure was 133 psig, the total pressure was 190 psig and the reaction medium was 2,2,4-trimethyl pentane.

EXAMPLE 6

Following the general operating procedure described hereinbefore, several catalysts were prepared and polymerization runs were made. Unless otherwise indicated, the total catalyst concentration in the reactor was 0.001 millimolar based on Ti and the polymerization temperature was 150° C. The catalysts are given in Table V and the polymerization results are given in Table VI. Unless otherwise indicated, ethylene pressure was 160 psig and the total pressure was 200 psig.

TABLE V

| Run No. | Order of Addition (1) | Atomic Ratios Mg/Ni/Al/XsCl/Ti |
|---|---|---|
| 1 | (NEH/EADC)/BEM/EADC/ATE/Ti(OiPr)$_4$ The atomic ratio of 64 Al was from 4(NEH/EADC) + 40 EADC + 20 ATE | 40/1/64/6/1 |
| 2 | NEH/BEM/EADC/ATE/Ti(OiPr)$_4$ The atomic ratio of 75 for Al was from 55 EADC + 20 ATE | 40/2.5/75/25/1 |
| 3 | (NEH/HCl)/ATE/DEM/EADC/Ti(OiPr)$_4$ The NEH and HCl were prereacted at a mole ratio of 5/10 in 2,2,4-trimethylpentane. The atomic ratio of 70 for Al was from 20 ATE + 50 EADC. | 40/5/70/20/1 |
| 4 | NEH/EADC/Ti(OiPr)$_4$/nBsBM$_2$ | 40/5/50/10/1 |
| 5 | NEH/TiCl$_4$/EADC/nBsBMg | 40/2/50/24/2 |
| 6 | Same | 40/2/50/24/2 |
| 7 | NEH/nBsBMg/EADC/Ti(OiPr)$_4$ | 40/2/50/16/1 |
| 8 | NEH/TiCl$_4$/SnCl$_4$/ATE/DBM | 40/2/50/10/1 |
| 9 | (NEH/HCl)/nBsBMg/EADC/Ti(OiPr)$_4$ NEH and HCl prereacted at mole ratio of 5/10 The NEH in 2,2,4-trimethyl pentane was passed through SiO$_2$ prior to reaction with HCl. | 40/5/50/20/1 |
| 10 | (Comparative) EADC/Ti(OiPr)$_4$/nBsBMg | 40/0/50/20/1 |
| 11 | (NEH/HCl)/EADC/Ti(OiPr)$_4$/nBsBMg The NEH and HCl were prereacted at a mole ratio of 2/4. The NEA in 2,4,4-trimethyl pentane was passed through SiO$_2$ before reacting with the HCl. | 40/2/50/20/1 |
| 12 | (NEH/HCl)/nBsBMg/EADC/Ti(OiPr)$_4$ The NEH and HCl were preacted at a mole ratio of 2/4. The NEA in 2,4,4-trimethyl pentane was passed through SiO$_2$ before reacting with the HCl. | 40/2/50/20/1 |
| 13 | NiOH$_2$/(NEH/HCl)/EADC/Ti(OiPr)$_4$/nBsBMg The NEH and HCl were prereacted at a mole ratio of 2/r. The NEA in 2,4,4-trimethyl pentane passed through SiO$_2$ prior to reacting with the HCl. The atomic ratio of 4 for Ni was from 2 Ni(OH)$_2$ + 2 NEH. | 40/4/50/20/1 |
| 14 | Same The atomic ratio of 7 for Ni was from 5 Ni(OH)$_2$ + 2 NEH. | 40/7/50/20/1 |
| 15 | NEH/Ni(OH)$_2$/EADC/Ti(OiPr)$_4$/ATE/nBsBMg The atomic ratio of 7 for Ni was from 2 NEH + 5 Ni(OH)$_2$. The atomic ratio of 60 for Al was from 50 EADC + 10 ATE. | 40/7/50/20/1 |

(1)
NEH = Ni(2-ethylhexanoate)$_2$
EADC = ethyl aluminum dichloride
BEM = n-butyl, ethyl magnesium
ATE = aluminum triethyl
Ti(OiPr)$_4$ = tetra (isopropoxy) titanium
HCl = hydrogen chloride
nBsBMg = n-butyl, sec-butyl magnesium
TiCl$_4$ = titanium tetrachloride
SnCl$_4$ = tin tetrachloride

TABLE VI

| Run No. | Catalyst Efficiency g polymer/ g Titanium × 10$^{-6}$ | Hydrogen Pressure psig | Melt Index I$_2$ | Melt Index I$_{10}$ | I$_{10}$/I$_2$ | Density g/cc |
|---|---|---|---|---|---|---|
| 1 | 1.23 | 19 | 0.78 | 8.70 | 1.15 | .9610 |
| 2 | 1.39 | 19 | 3.04 | 30.34 | 9.98 | .9656 |
| 3 | 2.20 | 19 | 0.55 | 8.25 | 15.00 | .9613 |
| 4 | 1.51 | 19 | 0.31 | 4.04 | 13.03 | .9628 |
| 5 | 2.65 | 19 | 1.09 | 11.54 | 10.59 | .9641 |
| 6 | 1.32 | 19 | 1.06 | 11.46 | 10.81 | .9620 |
| 7 | — | 19 | 1.22 | 13.41 | 10.99 | .9628 |
| 8 | 1.14 | 19 | 6.52 | 49.29 | 7.56 | .9644 |
| 9 | 0.92 | 19 | 0.08 | 1.58 | 19.75 | .9590 |
| 10 (Comparative) | 1.88 | 19 | 12.37 | 90.08 | 7.28 | .9686 |
| 11 | 1.45 | 19 | 0.55 | 7.43 | 13.51 | .9637 |
| 12 | 1.30 | 19 | 0.31 | 3.83 | 12.35 | .9613 |
| 13 | 1.87 | 19 | 0.53 | 6.53 | 12.32 | .9628 |
| 14 | 2.21 | 19 | 0.73 | 10.38 | 14.22 | .9646 |
| 15 | 2.27 | 19 | 2.74 | 26.72 | 9.75 | .9655 |

EXAMPLE 7

Following the general operating procedure described hereinbefore, several catalysts were prepared and polymerization runs were made. Unless otherwise indicated, the total catalyst concentration in the reactor was 0.001 millimolar based on Ti and the polymerization temperature was 150° C. The catalysts are given in Table VII and the polymerization results are given in Table VIII. Unless otherwise indicated, the temperature was 150° C., the ethylene pressure was 150 psig and 200 ml of 1-octene as a comonomer was employed and the total reactor pressure was 200 psig. No hydrogen was employed.

TABLE VII

| Run No. | Order of Addition (1) | Atomic Ratios Mg/Ni/Al/XsCl/Ti |
|---|---|---|
| 1 | EADC/Ti(OiPr)$_4$/nBsBMg (Comparative) | 40/0/50/20/1 |
| 2 | (NEH/HCl)/nBsBMg/EADC/ Ti(OiPr)$_4$ The NEH and HCl were prereacted at a mole ratio of 2/4. | 40/5/50/20/1 |
| 3 | (NEH/HCl)/nBsBMg/EADC/ Ti(OiPr)$_4$ The NEH and HCl were prereacted at a mole ratio of 5/10. | 40/5/50/20/1 |

(1) EADC = ethyl aluminum dichloride
Ti(OiPr)$_4$ = tetra(isopropoxy) titanium
nBsBMg = n-butyl, sec-butyl magnesium
HCl = hydrogen chloride
NEH = Ni(2-ethylhexanoate)$_2$

TABLE VIII

| Run No. | Catalyst Efficiency g polymer/ g Titanium $\times 10^{-6}$ | Melt Index $I_2$ | Melt Index $I_{10}$ | $I_{10}/I_2$ | Density g/cc |
|---|---|---|---|---|---|
| 1* | 1.4 | 0.58 | 5.77 | 9.95 | .9263 |
| 2 | 1.4 | 0.74 | 9.79 | 13.23 | .9196 |
| 3 | 1.7 | 0.50 | 6.56 | 13.12 | .9223 |

*Comparative

We claim:

1. In a process for the polymerization of an α-olefin under the conditions characteristic of Ziegler polymerization wherein the polymerization is conducted in the presence of, as a catalyst for said polymerization, a catalytic reaction product of (A) a tetravalent titanium compound or a complex of a trivalent titanium compound with an electron donor, (B) an organomagnesium component selected from (1) an organomagnesium compound or (2) a complex of an organomagnesium compound and an organometallic compound in an amount sufficient to solubilize the organomagnesium compound in a hydrocarbon solvent and (C) a halide source selected from (1) an active non-metallic halide, said non-metallic halide corresponding to the formula R'X wherein R' is hydrogen or an organic group at least as active as sec-butyl and X is halogen or (2) a metallic halide corresponding to the formula MR$_{y-a}$X$_a$ wherein M is a metal of Group 2B, 3A or 4A of Mendeleeve's Periodic Table of Elements, R is a hydrocarbyl or hydrocarbyloxy radical having from 1 to 20 carbon atoms, X is halogen, y is a number corresponding to the valence of M and a is a number having a value of from 1 to y; provided that the proportions of the foregoing components of said catalytic reaction product being such that the atomic ratio of Mg:Ti is from about 1:1 to about 2000:1, the atomic ratio of Al:Ti is from about 0.1:1 to about 2000:1, the atomic ratio of excess X:Al is from about 0.0005:1 to about 10:1; and further provided that when the organomagnesium compound and/or the halide source provides insufficient quantities of aluminum, there is also present an aluminum compound represented by the formula AlRy'Xy" wherein R and X are as defined above and y' and y" each have a value of from zero to three with the sum of y' and y" being three; the improvement which comprises employing as an additional component in the catalyst composition so as to broaden the molecular weight distribution, (D) an anhydrous divalent nickel compound such that the atomic ratio of Ni:Ti is from about 0.01:1 to about 500:1.

2. The process of claim 1 wherein the anhydrous divalent nickel compound is a nickel halide and wherein the atomic ratio of Mg:Ti is from about 5:1 to about 200:1 the atomic ratio of Al:Ti is from about 0.5:1 to about 200:1, the atomic ratio of Ni:Ti is from about 0.1:1 to about 100:1 and the atomic ratio of excess X:Al is from about 0.002:1 to about 2:1.

3. The process of claim 2 wherein the atomic ratio of Mg:Ti is from about 5:1 to about 75:1, the atomic ratio of Al:Ti is from about 1:1 to about 75:1, the atomic ratio of Ni:Ti is from about 1:1 to about 40:1 and the atomic ratio of excess X:Al is from about 0.01:1 to about 1.4:1.

4. The process of claim 1 wherein the anhydrous divalent nickel compound is a nickel carboxylate having from about 1 to about 12 carbon atoms.

5. The process of claim 4 wherein the nickel carboxolate has from about 6 to about 10 carbon atoms and wherein the atomic ratios of Mg:Ti, Al:Ti, Ni:Ti and excess X:Al are respectively from about 5:1 to about 200:1, from about 0.5:1 to about 200:1, from about 0.1:1 to about 100:1 and from abut 0.002:1 to about 2:1.

6. The process of claim 5 wherein said nickel carboxylate is nickel 2-ethylhexanoate or nickel naphthenate and wherein said ratios are respectively from about 5:1 to about 75:1, from about 1:1 to about 75:1, from about 40:1 and from about 0.01:1 to about 1.4:1.

7. The process of claim 6 wherein said nickel carboxylate is prereacted with a halogen source to form nickel halide.

8. The process of claims 3, 4, 5, 6 or 7 wherein the organomagnesium compound is a dihydrocarbyl magnesium.

9. The process of claims 3, 4, 5, 6 or 7 wherein the organomagnesium component is a complex of a dialkyl magnesium and a trialkyl aluminum wherein the atomic ratio of Mg to Al in the organomagnesium component is within the range from about 0.3:1 to about 1000:1.

10. The process of claims 3, 4, 5, 6 or 7 wherein the trivalent titanium complex is represented by the empirical formula TiZ$_3$(L)$_x$ wherein Z is halide, L is water, or alcohol, ether, ketone, amine or olefin each having 1 to 12 carbon atoms and x is a number from 1 to 6; the organomagnesium compound is dihydrocarbyl magnesium; the organometallic compound is an aluminum trihydrocarbyl; the non-metallic halide is hydrogen halide or hydrocarbyl halide; the metallic halide is an aluminum halide corresponding to the formula AlR$_{3-a}$X$_a$ wherein R is alkyl, X is halogen, and a is a number from 1 to 3.

11. The process of claim 10 wherein the complex is a complex of titanium trichloride and an alcohol having from 3 to 6 carbon atoms, the dihydrocarbyl magnesium is dialkyl magnesium, the aluminum trihydrocarbyl is aluminum trialkyl, the non-metallic halide is hydrogen chloride or t-alkyl chloride; and the aluminum halide is an alkyl aluminum chloride.

12. The process of claim 11 wherein the complex is a complex of titanium trichloride and isopropyl alcohol and x is 2 to 4 and the dialkyl magnesium is ethyl n-butyl magnesium or ethyl butyl magnesium and the halide source is hyrogen chloride, diethyl aluminum chloride or ethyl aluminum dichloride.

13. The process of claims 3, 4, 5, 6 or 7 wherein the titanium compound is a tetravalent titanium compound.

14. The process of claim 13 wherein the tetravalent titanium compound is tetraisopropoxy titanium.

15. The process of claims 1 or 2 wherein the process is conducted under solution polymerization conditions.

16. The process of claim 8 wherein the process is conducted under solution polymerization conditions.

17. The process of claim 9 wherein the polymerization is conducted under solution polymerization conditions.

18. The process of claim 13 wherein the polymerization is conducted under solution polymerization conditions.

19. The process of claim 14 wherein the polymerization is conducted under solution polymerization conditions.

* * * * *

UNITED STATES PATENT AND TRADEMARK OFFICE
CERTIFICATE OF CORRECTION

PATENT NO. : 4,243,785
DATED : Jan. 6, 1981
INVENTOR(S) : D. F. Birkelbach, G. W. Knight It is certified that error appears in the above-identified patent and that said Letters Patent are hereby corrected as shown below:

Column 5, line 23; change "preferaby to --preferably--.

Column 13, in Table III, second line of footnote, change "butyl" to --n-butyl--.

Column 14, in Table V, on Run 15, under heading "Atomic Ratios", change "40/7/50/20/1" to --40/7/60/20/1--.

Column 14, Table VI, under heading "$I_{10}/I_2$, Run 1; change "1.15" to --11.15--.

Column 15, line 3; delete the "and" between "psig" and "200".

Column 16, line 24; change "abut" to --about--.

Column 16, line 29, insert --1:1 to about --in front of "40:1".

Signed and Sealed this

*Nineteenth* Day of *May 1981*

[SEAL]

*Attest:*

RENE D. TEGTMEYER

*Attesting Officer*      *Acting Commissioner of Patents and Trademarks*